May 19, 1931. W. T. DAVIS 1,805,571
PLANT PROTECTOR
Filed July 31, 1930
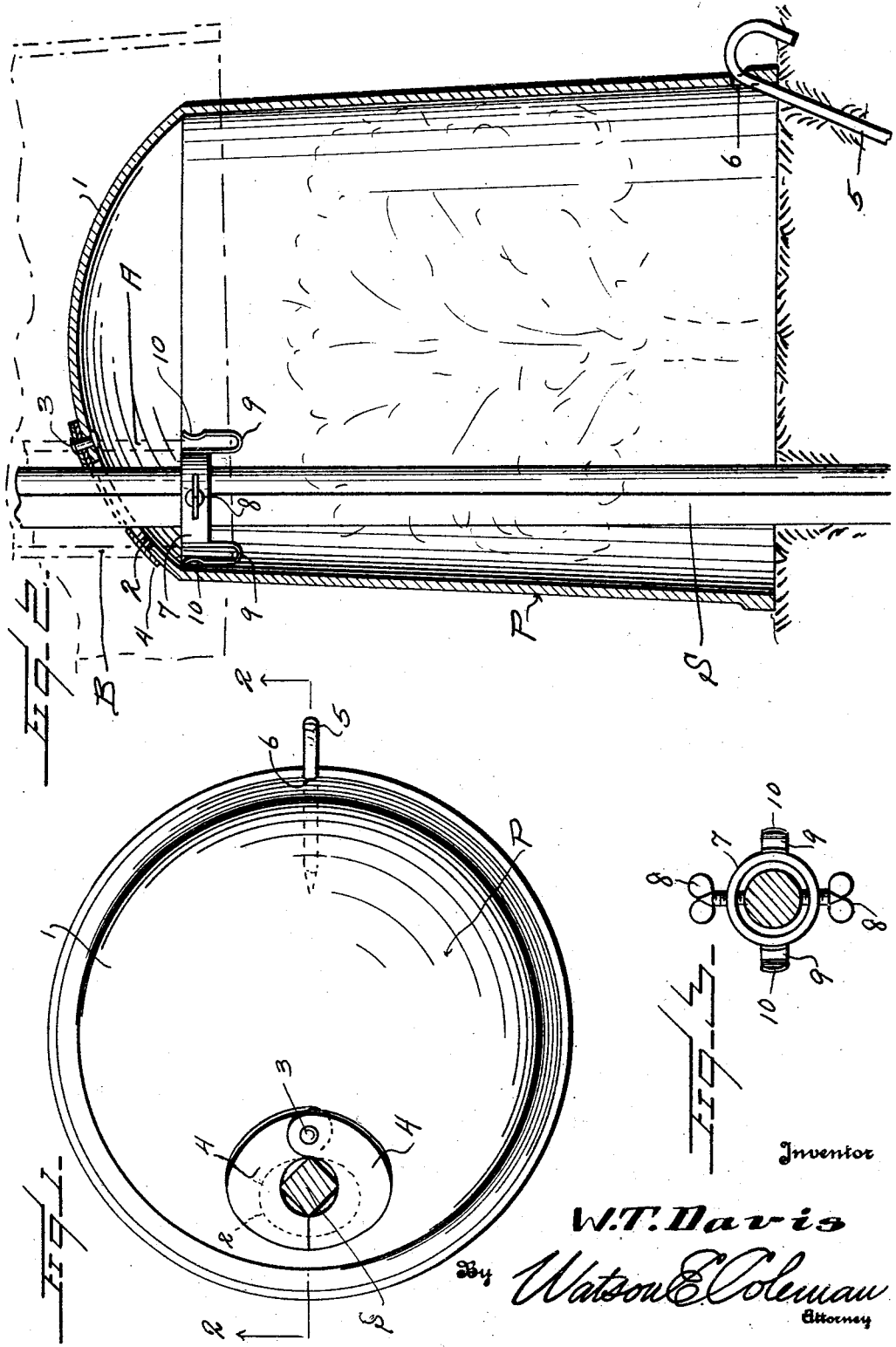
Inventor
W. T. Davis
By Watson E. Coleman
Attorney Patented May 19, 1931

1,805,571

UNITED STATES PATENT OFFICE

WALTER T. DAVIS, OF PARKERSBURG, WEST VIRGINIA

PLANT PROTECTOR

Application filed July 31, 1930. Serial No. 472,054.

This invention relates to a plant protector, and it is an object of the invention to provide a device of this kind which can be employed to advantage in protecting a plant against frost and which can also be used to afford protection against excessive heat rays.

Another object of the invention is to provide a device of this kind constructed in a manner whereby it may be applied in working position with dispatch and convenience.

An additional object of the invention is to provide a device of this kind adapted to be employed in connection with a stake or kindred member and wherein means are provided for holding the protector at a desired elevation with respect to the plant and with the protector in a position directly above the plant or to one side thereof, together with means whereby the protector may be securely anchored against displacement when positioned to envelop the plant.

The invention consists in the details of construction and in the combination and arrangement of the several parts of my improved plant protector whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in top plan of a plant protector constructed in accordance with an embodiment of my invention and in lowered position, the associated stake being in section;

Figure 2 is a vertical sectional view taken substantially on the line 2—2 of Figure 1 with the stake, supporting bracket and anchoring member in elevation;

Figure 3 is a view partly in section and partly in top plan illustrating the supporting member in applied position upon a stake, the protector proper being omitted.

As disclosed in the accompanying drawings, P denotes a protector of desired dimensions and configuration and which may be made of any desired material. It is preferred that the walls of the protector be opaque and, of course, the material employed is one which possesses a low degree of heat conductivity so that when the protector is positioned over a plant, as illustrated in Figure 2, such plant is effectively protected against frost and against a temperature below freezing.

The protector P may be molded from vegetable fibre or otherwise constructed as desired, it only being required that the protector possess the salient characteristics hereinbefore set forth.

The upper end of the protector P is closed by a head 1 herein disclosed as substantially concavo-convex although this particular configuration is not essential. To one side of its axial center and preferably in relatively close proximity to its outer margin, the head or top 1 is provided with a relatively large opening 2 through which is adapted to be directed a stake S or the like positioned adjacent to the plant. Pivotally connected, as at 3, to the head or top 1 of the protector P are the oppositely disposed shutters 4 preferably made of a material possessing sufficient inherent resiliency to cause the same at all times to have close contact with the head or top 1 of the protector and to conform to the surface thereof with which the shutters coact. Each of these shutters 4 is arcuate in form. By proper relative adjustment of the shutters 4 the major portion of the opening 2 surrounding the stake S may be closed to materially reduce the air circulation especially when the stake S is of small diameter. There will, however, be sufficient leakage out through the opening 2 between the shutters 4 and the stake S to assure the desired circulation of air within the protector P when the same is in set position upon the ground over a plant.

When the protector P is in set position over the plant, as illustrated in Figure 2, a holding shank or pin 5 is inserted through an opening 6 in the lower portion of the protector P and forced within the ground. This locking of the protector P is of importance as it prevents the protector from swinging around the stake S under the action of the wind which would have a tendency to injure the plant.

By use of the shank or pin 5 the protector P is effectively maintained in substantially a fixed position with respect to the plant.

Surrounding the upper portion of the stake S and preferably at a point above the top of the plant is an annular member or ring 7 clamped or held in desired selective position by the diametrically opposed set screw 8 threaded through the member 7 for holding contact with the stake S. At diametrically opposed points the ring or member 7 is provided with the depending and upwardly facing hook members 9, the upwardly disposed bills 10 of which being resilient. The member or ring 7 is so applied to a stake S as to have one of the hook members 9 disposed toward the plant and the member or ring 7 is of such diameter that when the protector P is raised above the plant and swung around into position away from the plant, a lower or open marginal portion of the protector will be readily received within the hook member 9 disposed toward the plant as indicated by broken lines at A in Figure 2. This position of the protector just mentioned is adapted to be maintained when the temperature is above freezing. Upon indications of falling temperature, it is only required that the protector P be raised upwardly sufficiently to release the same from the hook member 9 and then swung around over the plant and permitted to drop down and after which the shank or pin 5 is applied. By raising the protector P above the plant and engaging an open marginal portion thereof with the second or outermost hook member 9, as at B, the protector P will be maintained in a raised position above the plant. This is of advantage as the protector in such position may serve as a shade to protect the plant against excessive heat rays.

It is believed to be apparent from the foregoing that my improved protector and the manner of mounting is such to permit the protector to be readily and quickly applied over a plant when demanded and with equal facility to be raised above the plant and moved in a position to one side thereof or to be maintained thereabove as preferred.

From the foregoing description it is thought to be obvious that a plant protector constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. In combination, a plant protector having a closed end provided with an opening, a stake extending through said opening permitting the protector to be readily raised and lowered along the stake, and means carried by the stake for holding said protector in a raised position, the opening in the closed end of the protector being to one side of the axial center of said end permitting the protector to be swung laterally with respect to the stake.

2. In combination, a stake, a protector having a closed end provided with an opening to one side of its axial center, the stake being disposed through the opening, substantially oppositely disposed holding members carried by the stake, one of said members coacting with the protector for supporting the same when raised and positioned substantially above a plant, the second of said holding members engaging the protector to support the same after the protector has been raised and swung away from the plant.

3. In combination, a stake, a protector having a closed end provided with an opening to one side of its axial center, the stake being disposed through the opening, substantially oppositely disposed holding members carried by the stake, one of said members coacting with the protector for supporting the same when raised and positioned substantially above a plant, the second of said holding members engaging the protector to support the same after the protector has been raised and swung away from the plant, each of said holding members being engageable with the lower portion of the protector.

In testimony whereof I hereunto affix my signature.

WALTER T. DAVIS.